United States Patent [19]
Bishop et al.

[11] 3,802,970
[45] Apr. 9, 1974

[54] FLEXIBLE EXOTHERMIC MAT COMPRISING PARTICULATE ALUMINUM, BINDERS AND OXIDIZERS

[75] Inventors: Harold F. Bishop; James R. Deck, both of Conneaut, Ohio

[73] Assignee: Exomet, Incorporated, Conneaut, Ohio

[22] Filed: Mar. 16, 1973

[21] Appl. No.: 342,055

Related U.S. Application Data

[62] Division of Ser. No. 163,722, July 19, 1971, Pat. No. 3,751,308.

[52] U.S. Cl............................ 149/15, 149/2, 149/37
[51] Int. Cl............................................. B23k 23/00
[58] Field of Search............ 102/103; 149/2, 15, 18, 149/21, 44

[56] References Cited
UNITED STATES PATENTS

| | | | |
|---|---|---|---|
| 3,067,686 | 12/1962 | Coover, Jr. et al. | 102/103 X |
| 3,159,104 | 12/1964 | Hodeson | 102/103 |
| 3,176,618 | 4/1965 | Forsberg et al. | 264/3 R |
| 3,287,190 | 11/1966 | Long | 149/12 |
| 3,715,414 | 2/1973 | Schultz et al. | 149/15 X |
| 3,720,552 | 3/1973 | Lustigue | 149/15 X |

*Primary Examiner*—Leland A. Sebastian
*Attorney, Agent, or Firm*—Barry Moyerman; James C. Simmons

[57] ABSTRACT

An exothermic charge is secured to a flexible backing material forming an elongated mat. Grooves in the mat extending from the surface of the charge to the backing material allow the mat to be placed over a regular shape such as a pipe to provide a covering blanket of exothermic charge. The flexible mat is particularly useful in combination with insulation and other accessories for exothermically annealing welded pipe and the like in the field.

7 Claims, 4 Drawing Figures

FLEXIBLE EXOTHERMIC MAT COMPRISING PARTICULATE ALUMINUM, BINDERS AND OXIDIZERS This is a division, of application Ser. No. 163,722, filed July 19, 1971, now U.S. Pat. 3,751,308.

BACKGROUND OF THE INVENTION

This invention pertains to heat treating of welded joints in structural elements by means of exothermic charges placed around the area to be treated. In the construction industry and in particular in construction of process plants employing many miles of pipe; the pipe is installed by welding successive lengths and joints such as tees, elbows, reducers, and the like at the construction site. Because the pipe sections are welded together, the welds and heat affected zones must be given a post-welding thermal treatment in order to reduce the residual stresses inherent in a weld where there was non-controlled cooling of the weldment. The type of post heat treatment depends upon the overall size, composition, and wall thickness of the welded sections and can be at a temperature either above or below the critical temperature. As a general rule the weld is heated to below the critical temperature for the metal composition, allowed to achieve temperature uniformity throughout the section being heated and then the temperature is gradually reduced to ambient. To a large extent the post-welding heat treatment, i.e., time, temperature and rate of cooling, are specified by industry and local building codes.

The most successful method of post-welding heat treatment of pipe and the like erected in the field is by an apparatus and method developed by Exomet, Inc. of Conneaut, Ohio, and marketed under the name EXO-ANNEAL. The EXO-ANNEAL apparatus consists of a kit containing shaped exothermic charges, insulation both high temperature and low temperature, insulating cement, sealing rings and fastening wires. Each kit is made up at the factory for a pre-ordered pipe size and can only be used on that size. The insulation and other components are selected and packed accordingly. In a large installation this requires a large number of kits to be in inventory to accommodate the varying pipe grades and sizes.

U.S. Pat. No. 3,192,080, is drawn to an exothermic heat treating apparatus and method also employing pre-shaped parts. This method has never been adopted because of the use of different exothermic sleeves in each unit or kit.

BRIEF DESCRIPTION OF THE INVENTION

In order to avoid the above-mentioned problems with prior art exothermic heat treating devices and to provide an improved method and apparatus for exothermically treating weldments, it has been discovered that when the exothermic charge is affixed to a flexible backing or reenforcing in the form of a blanket or mat in a manner that allows shaping of the mat to regular surfaces in the field, and the mat combined with proper insulation can be used for many different sizes and grades of pipe and to provide a broad range of thermal treatments. The mat of exothermic material can be readily cut to the length and width desired in the field and shaped by hand because of apertures or grooves molded into the mat by the manufacturer. With this mat there is no need for large inventories of kits as the mat can be used at elbows, tees and the like.

Therefore, it is the primary object of this invention to provide a method and apparatus for post heat treatment of weldments.

It is another object of this invention to provide a flexible exothermic charge in the form of a mat.

It is still another object of this invention to provide a method for using a flexible exothermic charge in combination with insulation and fastening devices in order to accomplish controlled thermal treatment of a weldment.

DETAILED DESCRIPTION OF THE PREFERRED EMBODIMENT

Figure 1:
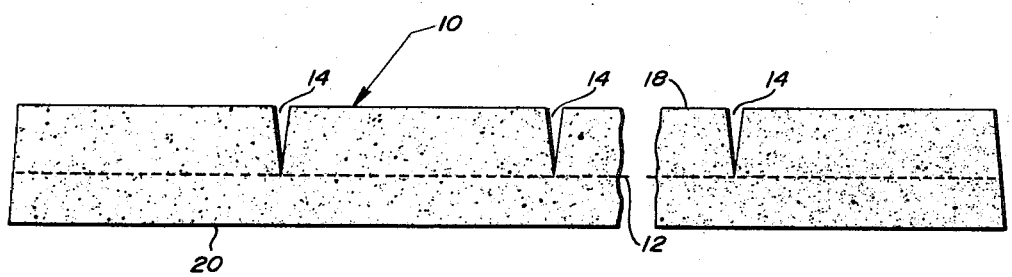
FIG. 1 is an enlarged fragmented front view of the exothermic mat according to the present invention.
Figure 2:
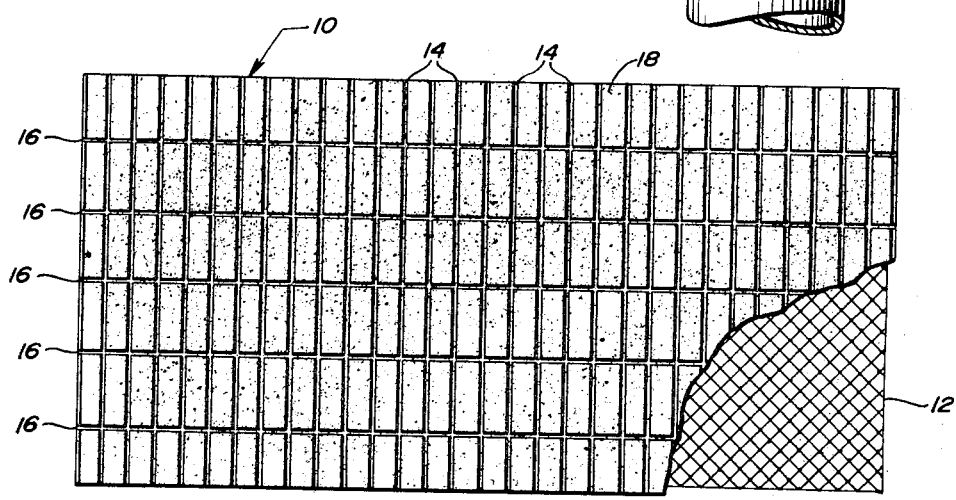
FIG. 2 is a plan view of the exothermic mat with portions broken away to illustrate a method of application to a flexible backing.

Referring to the drawing and in particular to FIGS. 1 and 2, there is shown a molded exothermic mat 10 of a composition within the following broad range:

| Constituent | Percent by Weight |
|---|---|
| Fuel | 15–30 |
| Binder | 3–10 |
| Oxidizers | 15–35 |
| Flux | 0.5–3.0 |
| Refractory | 25–40 |

In the above compositions the preferred fuel is finely divided aluminum in the form of 200 mesh (Tyler Standard Sieve Series) powder, grindings of 100 mesh and chopped foil in the range of −20 to +200 mesh; the binder is starch, phenolic resin, natural sugars, synthetic sugars or mixtures thereof; the oxidizers are selected from the group consisting of manganese dioxide, red iron oxide ($Fe_2O_3$), barium nitrate, sodium nitrate and mixtures thereof; the flux is cryolite; and the preferred refractory is ground fire brick in the size range of −20 to +150 mesh.

A preferred exothermic composition is:

| Constituent | % by weight |
|---|---|
| Al Foil | 19.4 |
| Phenolic Resin | 8.6 |
| Red Iron Oxide | 34.0 |
| Cryolite | 1.7 |
| Ground Fire Brick | 36.3 |

In the above formula the aluminum foil and ground fire brick were found to have a particle size distribution as follows:

| Tyler Sieve Size (mesh) | Percent Retained Al Foil | Brick |
|---|---|---|
| 20 | 0 | 4 |
| 35 | 60 | 59 |

-Continued

| Tyler Sieve Size (mesh) | Percent Retained Al Foil | Brick |
|---|---|---|
| 50 | 20 | 20 |
| 100 | 16 | 16 |
| 50 | 2 | -- |
| Pan | 2 | 1 |

The exothermic mat 10 is formed around a flexible backing 12 such as a wire screen with openings of approximately 1 inch. The mat 10 has a series of generally parallel and equally spaced grooves 14 disposed perpendicular to one edge of the mat 10. It is preferable that the mat 10 has a generally rectangular shape in top view so the grooves 14 are perpendicular to the long side of the rectangle. Grooves 14 extend from the top surface 18 to the flexible backing 12 and have a generally V-shaped cross section. A second series of grooves 16 (FIG. 2) are provided perpendicular to grooves 14. These second grooves 16 are generally parallel to each other and equally spaced across the mat, extending in depth to a point above the flexible back 12.

Figure 3:
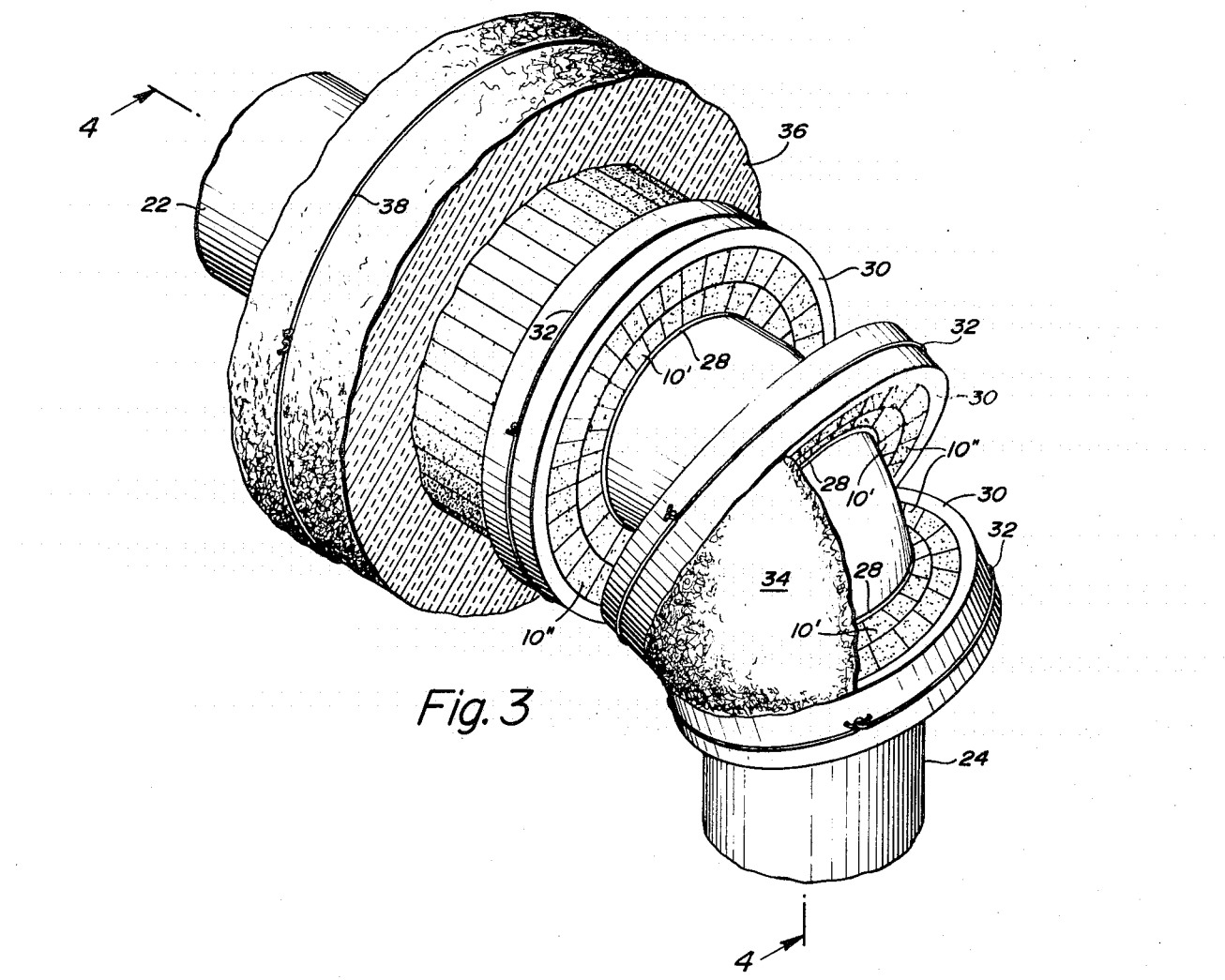
FIG. 3 is an isometric view of a pipe to elbow joint ready for exothermic heat treating according to the present invention, certain portions of the installation having been eliminated for the sake of clarity.

The purpose of grooves 14 is to allow the mat 12 to be wrapped around a regular surface such as a pipe with the result that the pipe is uniformly surrounded by an exothermic mat or blanket. This is illustrated in FIG. 3 and will be more fully described hereinafter.

Grooves 16 are provided so that the mat 10 can be cut to varying widths for a given length.

Manufacture of the mat 10 is carried out using a molding box provided with projections in the bottom corresponding to the required grooves 14 and 16. After the box is filled with the exothermic mix, a wire screen 12 or other backing is embedded therein. It may be desirable to put additional notches (not shown) in the blanket on the surface 20, opposite to the notch 14, openings on surface 18, to aid in field installation of the blanket. After baking, the blanket is hard and relatively brittle so that it can be handled and when required formed to shape.

Mats according to the present invention are particularly used for pipe sizes of four inches outside diameter and larger. To accommodate this range of pipe sizes, mats are made according to the following dimensions:

| | |
|---|---|
| Overall Length | 30 inches |
| Overall Width | 12 inches |
| Overall Thickness | 7/8 inches |
| Distance Between Grooves 14 | 5/8 inches |
| Width of Grooves 14 | 1/8 inches |
| Depth of Grooves 14 | 1/2 inches |
| Distance Center Line of Grooves 16 | 2 inches |
| Shape of Grooves 14, 16 | "V" |

The above dimensions are critical to the extent they have proven satisfactory for uses as will hereinafter be described. The dimensions of grooves 16 are not necessarily described because these grooves serve only as the means for determining the width of blanket to be used.

Figure 4:
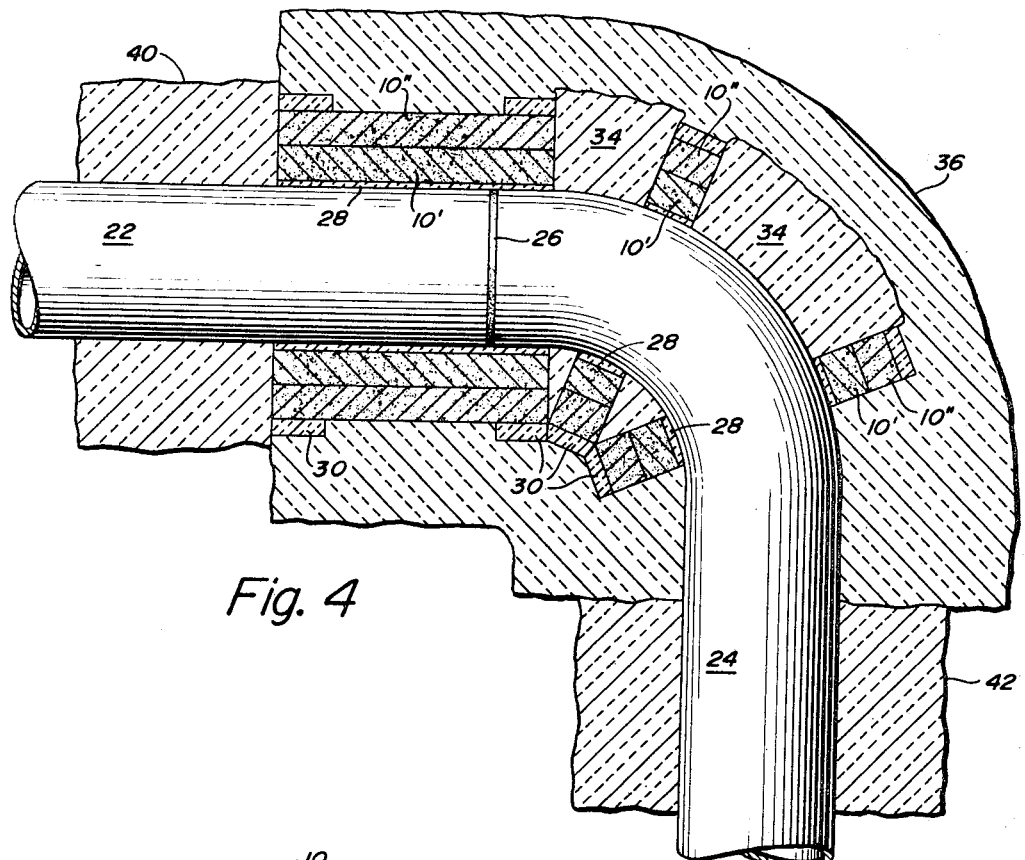
FIG. 4 is a section taken along lines 4—4 of FIG. 3 with the removed portions shown for clarity.

Referring now to FIGS. 3 and 4, there is shown a pipe 22 to elbow 24 connection by weld seam 26. In order to relieve the stresses in the weld and surrounding base metal, exothermic mats 10', 10'', together with necessary accessories, will be installed on the joint.

The first step is installation of a layer of thin flexible insulation 28 around the pipe 22 and elbow 26 where the exothermic is to be placed. The insulation must overlap the weld according to the temperature desired as is specified for the pipe size and composition. Next two layers of exothermic mat 10' and 10'' are placed over the insulation 28. The width of the mat is selected according to the temperature and in the case of a pipe to elbow, the thinner rings are added to assure uniform heating of the entire heat affected area of the joint. After the exothermic mats 10', 10'' are in place they are covered with a 2-inch strip of heavier insulation 30, over which is placed a final support wire 32. The insulation 30 is spaced about 4 inches apart on full width mats and the wires 32 assure in situ reaction of the exothermic composition. The voids between the mats are filled with a low temperature insulation 34, and the entire assembly is covered with a composite outer insulation 36 and secured in place with wires 38 (FIG. 3). Additional low temperature insulation 40, 42 (FIG. 4) is placed at the outer ends of the exothermic and fastened with wires (not shown). Insulation 40, 42 is mounted so that it can be moved away from the insulation in order to ignite the mats 10', 10''. After reaction of the mats 10', 10'', the insulation 40, 42 can be moved against the mats in order to control the cooling of the entire assembly.

Set forth in Examples I-IV are required items and sizes in order to accomplish exothermic post-welding heat treatment according to the present invention.

Example I

4'' Schedule 40 or Standard Weight Pipe to Pipe Joint Stress Relieved at 1150 to 1275°F

| Item | No. of Pieces | Width | Length |
|---|---|---|---|
| Insulation 28 (.062'' thick) | 1 | 6'' | 29 3/4'' |
| Exothermic Mat 10' | 1 | 6'' | 18 1/4'' |
| Exothermic Mat 10'' | 1 | 6'' | 23 1/2'' |
| Insulating Strips 30 | 2 | 2'' | 29'' |
| Insulation 36 | 1 | 7'' | 36'' |
| Insulation 42 | 2 | 16'' | 21'' |

Example II

4'' Schedule 80 or extra heavy Pipe to Pipe Joint Stress Relieved at 1350 to 1475°F

| Item | No. of Pieces | Width | Length |
|---|---|---|---|
| Insulation 28 (.062''thick) | 1 | 14'' | 29 3/4'' |
| Exothermic Mat 10' | 1 | 14'' | 18 1/4 |
| Exothermic Mat 10'' | 1 | 14'' | 23 1/2'' |
| Insulating Strips 30 | 4 | 2'' | 29'' |
| Insulation 36 | 1 | 15'' | 36'' |
| Insulation 72 | 2 | 16'' | 21'' |

Example III

10" Schedule 20 Pipe to Pipe Joint Anneal at 1550 to 1650°F

| Item | No. of Pieces | Width | Length |
|---|---|---|---|
| Insulation 38 (.062" thick) | 1 | 18" | 34" |
| Exothermic Mat 10' | 1 | 18" | 36 5/8" |
| Exothermic Mat 10" | 1 | 18" | 42 3/4" |
| Exothermic Mat * | 1 | 18" | 48 1/4" |
| Insulating Strips 30 | 5 | 2" | 55" |
| Insulation 36 | 1 | 19" | 70" |
| Insulation 42 | 2 | 16" | 41" |
| Sealing Insulation ** | 2 | 4" | 53" |

* Third mat placed over mat 10" in same manner as described.
** Placed at the joint of insulation 36 and 42 covering insulation 42.

Example IV

20" Schedule 30 pipe to pipe joint 1150 to 1275°F stress relieve treatment

| Item | No. of Pieces | Width | Length |
|---|---|---|---|
| Insulation 28 (0.23" thick) | 1 | 24" | 63" |
| Exothermic Mat 10' | 1 | 24" | 65 3/4" |
| Exothermic Mat 10" | 1 | 24" | 71" |
| Insulating Strips 30 | 8 | 2" | 75" |
| Insulation 36 | 1 | 15" | 94" |
| Insulation 42 | 2 | 16" | 70" |

In the above examples, insulation 28 is an asbestos paper having an asbestos fiber content of 99 percent and is sold by Johns-Manville as asbestos welding paper. The insulating strips 30 are ¼ inch thick and are prepared, commercially available, white insulating asbestos. They serve to prevent burn through of wires 32 during reaction of the exothermic charge. In place of wire 32 regular commercial metal banding or strapping can be used. Insulation 36 is a composite consisting of asbestos welding paper next to the exothermic mat; to this is fastened an alumina-silica fiberous insulation about ½ inch thick having a density of 8 pounds per cubic foot and is sold under the tradename CERAFELT by Johns-Manville; this is covered by a layer of mineral fiber blanket 2 inches thick having a density of 8 pounds per cubic foot, sold by Eagle-Picher Industries, Inc. under the tradename SUPERGLAS. The insulation 42 and sealing insulation of Example III are made from the same mineral fiber as the outer 2 inches of insulation 36.

From the above examples it can be seen that the apparatus and method of the instant invention is applicable to an infinite variety of exothermic heat treating problems. The method can be tailored to fit the pipe size, shape, composition, joint and atmospheric conditions to satisfy all weld treating codes. In the matter of insulation this can be varied to accomplish longer or shorter post heating cooldown depending upon the material.

Flexible exothermic mats and accessories according to the present invention can also be used to pre-heat pipe sections prior to welding as well as for other routing maintenance work in the field.

The exothermic can be manufactured on a plastic, paper, cardboard, thin foil, carpet or other flexible backing that may or may not be within the exothermic. Once the exothermic is in place, the backing has really served its purpose. The primary purpose of the perforated back is to provide structural strength to the exothermic mat and to allow cutting of the mat to the proper length and width without unnecessary crumbling of the exothermic.

Having thus described our invention, the following is desired to be secured by Letters Patent of the United States.

We claim:

1. A flexible exothermic material suitable for field heat treating of welded pipe, and the like, comprising:

a flexible backing;
an exothermic charge secured to said backing, said charge consisting of 15 to 30 percent by weight fuel selected from the group consisting of 200 mesh aluminum powder, 100 mesh aluminum grinding and −20 to +200 mesh aluminum foil, 3 to 10 percent by weight binder selected from the group consisting of starch, phenolic resin, natural sugars, synthetic sugars or mixtures thereof, 15 to 35 percent by weight oxidizer selected from the group consisting of manganese dioxide, red iron oxide ($Fe_2O_3$), barium nitrate, sodium nitrate and mixtures thereof; 0.5 to 3 percent by weight flux, and 25 to 40 percent by weight refractory having a particle size of −20 to +150 mesh; and
a series of grooves in said exothermic charge generally parallel to and uniformly spaced one from the other, said grooves extending from one surface of the exothermic toward the backing material to an effective depth; whereby the backing material and exothermic may be readily shaped to a regular shaped contour.

2. An exothermic material according to claim 1 wherein the grooves are in the shape of an inverted triangle.

3. An exothermic material according to claim 1 wherein there are a plurality of parallel grooves uniformly spaced from each other and generally perpendicular to the first series of grooves.

4. An exothermic material according to claim 1 wherein the backing material is a wire screen of a mesh size of greater than one-eighth inch.

5. An exothermic material according to claim 1 wherein the backing material is selected from the group consisting of kraft paper, cloth, plastic sheeting, cardboard, a plurality of parallel elongate flexible rods, and carpet backing.

6. An exothermic material according to claim 1 wherein the flux is cryolite and the refractory is ground fire brick.

7. An exothermic material according to claim 1 wherein the exothermic charge is approximately 19.4 percent by weight finely divided aluminum, 8.6 percent by weight phenolic resin, 34 percent by weight red iron oxide ($Fe_2O_3$), 1.7 percent by weight flux and 36.3 percent by weight refractory.

* * * * *